United States Patent
Wallis et al.

(10) Patent No.: US 10,934,227 B2
(45) Date of Patent: Mar. 2, 2021

(54) COMPOST BIN

(71) Applicant: New Zealand Box Limited, Auckland (NZ)

(72) Inventors: Anthony Bruce Wallis, Gladesville (AU); Richard Wallis, Auckland (NZ); Grant Stevens, Whangarei (NZ)

(73) Assignee: NEW ZEALAND BOX LIMITED, Meadowbr Ook (AU)

( * ) Notice: Subject to any disclaimer, the term of this patent is extended or adjusted under 35 U.S.C. 154(b) by 628 days.

(21) Appl. No.: 15/558,650

(22) PCT Filed: Mar. 16, 2016

(86) PCT No.: PCT/AU2016/050182
§ 371 (c)(1),
(2) Date: Sep. 15, 2017

(87) PCT Pub. No.: WO2016/145486
PCT Pub. Date: Sep. 22, 2016

(65) Prior Publication Data
US 2018/0105476 A1    Apr. 19, 2018

(30) Foreign Application Priority Data
Mar. 17, 2015  (AU) ................... 2015900949

(51) Int. Cl.
*C05F 17/964* (2020.01)
*C05F 17/90* (2020.01)
(Continued)

(52) U.S. Cl.
CPC ............. *C05F 17/964* (2020.01); *C05F 9/02* (2013.01); *C05F 17/90* (2020.01); *C05F 17/907* (2020.01);
(Continued)

(58) Field of Classification Search
CPC ............. C05F 17/0205; A47B 47/0058; A47B 47/0083
See application file for complete search history.

(56) References Cited

U.S. PATENT DOCUMENTS

| 3,037,593 | A | 6/1962 | Webster |
| 6,019,239 | A | 2/2000 | Watson |

(Continued)

FOREIGN PATENT DOCUMENTS

| CA | 2116648 A1 * | 8/1995 | ................ C05F 9/02 |
| DE | 7818001 U1 | 11/1978 | |

(Continued)

OTHER PUBLICATIONS

Composting Bins-Autogrow, http://www.autogrow.co.uk/compost-bins/ (May 10, 2010), pp. 1-4. (Year: 2010).*

(Continued)

*Primary Examiner* — William H. Beisner
(74) *Attorney, Agent, or Firm* — Welsh Flaxman & Gitler LLC (57) ABSTRACT

A compost bin module for aerobic decomposition of organic matter. The module is in the form of a container comprising a free-standing portable structural frame for placement on or above the ground. It further comprises removable sidewalls, and an open top and open bottom. Each of said removable side walls insertable into the structural frame and laterally restrained thereby. The structural frame comprises at least three spaced-apart posts, at least an equal number of structural members spanning between and interconnecting the posts, each of the structural members spanning between two adjacent posts at or near their base.

19 Claims, 7 Drawing Sheets

(51) Int. Cl.
*C05F 17/907* (2020.01)
*C05F 17/914* (2020.01)
*C05F 17/957* (2020.01)
*C05F 9/02* (2006.01)

(52) U.S. Cl.
CPC .......... *C05F 17/914* (2020.01); *C05F 17/957* (2020.01); *Y02A 40/20* (2018.01); *Y02P 20/145* (2015.11); *Y02W 30/40* (2015.05)

(56) References Cited

U.S. PATENT DOCUMENTS

| 6,921,661 | B2 | 7/2005 | Nagy et al. | |
| 6,997,332 | B1 * | 2/2006 | Alexander | A47B 47/027 |
| | | | | 211/182 |
| 8,904,706 | B1 | 12/2014 | Smith | |
| 2006/0246579 | A1 | 11/2006 | Thurot | |
| 2011/0252702 | A1 | 10/2011 | Gazjuk | |

FOREIGN PATENT DOCUMENTS

| DE | 8311220 U1 | 10/1983 | | |
| DE | 8626887 U1 | 1/1987 | | |
| FR | 2480709 A1 | 10/1981 | | |
| FR | 2684838 | 6/1993 | | |
| FR | 2980471 | 3/2013 | | |
| FR | 2983460 A1 * | 6/2013 | ............ | C05F 17/907 |
| GB | 2154549 | 9/1985 | | |

OTHER PUBLICATIONS http://www.instructables.com/id/The-Best-Triple-Compost-Bin/?ALLSTEPS> published Sep. 25, 2011.
Harrod Horticultural Ltd 2018, Slot Together Compost Bins—Harrod Horticultural (UK), web-page, Oct. 1, 2018, 2 pages, https://www.harrodhorticultural.com/slot-and-slide-compost-bins-pid8703.html.
Suttons Est. 1806, Modular Wooden Compost Bins, web-page, Oct. 1, 2018, 3 pages, http://suttons.co.uk/Gardening/Garden+Equipment/Compost+Bins+and+Composters/Modular+Wooden+Compost+Bin MH105.htm.
Office Action (dated May 10, 2018) and Reply (Oct. 26, 2018) in AU2016232985.
Office Action (dated Nov. 10, 2017) and Reply (May 2, 2018) in NZ717976.
Office Action (dated Jan. 24, 2020) and Reply (Apr. 24, 2020) in JP 2017-567508.

* cited by examiner

COMPOST BIN

TECHNICAL FIELD

This invention relates to a compost bin module designed specifically for aerobic decomposition of organic matter. In particular, the invention is described with reference to a free standing portable compost bin module that allows for unimpeded access from all sides, and s capable of being connected to like modules to form an assembly.

BACKGROUND

The rapid contraction of available landfill sites near urban centres where organic "waste" is generated requires the implementation of local organic "waste" recycling solutions. In practice, local composting doesn't lend itself to industrial scale and is inevitably a smaller scale, labour intensive process with consequent commercial challenges.

The preferred method of producing compost is aerobic composting which, although producing inherently superior compost faster and with better environmental outcomes, has the inherent disadvantage that it is highly labour intensive. This has resulted in too little of society's organic waste being composted and used locally, and that, which is made and used locally, tends to be made anaerobically.

Despite the obvious need for local aerobic composting there are no satisfactory solutions for either the consumer or the commercial operator.

For the purposes of this specification a compost bin, module or assembly which provides "aerobic decomposition of organic matter" is one that operates aerobically throughout the entire composting cycle. This can only be achieved in compost bins where the contents are periodically turned at interval short enough to maintain well diffused air through the compost sufficient to maintain aerobic action. There are no commercially available consumer "aerobic" compost bins that have both the required volume and the facility to efficiently turn the compost.

All compost bins will operate aerobically in certain circumstances; any large volume of organic material well diffused with air will compost aerobically until the air is exhausted. This fact is used by many manufacturers to misleadingly claim their bins are aerobic, when in fact the aerobic action occurs only at the time the bin is initially charged with organic material. Once the air is exhausted, the process becomes anaerobic and, in the absence of turning, remains anaerobic until the composting action is completed. Such bins are properly classified as anaerobic.

The efficiency and utility of aerobic composting is primarily a function of temperature; the higher the temperature the faster the composting process, the greater the ability to sterilize seeds and pathogens present in green waste and the greater the ability to compost certain manufactured items such as disposable coffee cups made of Polylactic Acid, which would otherwise have to go to landfill.

The aerobic process of micro-organisms breaking down the organic matter is exothermic. If the resultant heat is prevented or slowed from escaping to the atmosphere, the temperature of the organic matter rises, facilitating more rapid reproduction of the micro-organisms, thereby increasing the rate of composting and improving efficiency. There are two methods to raise and maintain compost temperature; compost volume and shape. Increased volume increases the micro-organism population and consequently the rate at which heat is produced, whilst simultaneously reducing the ability of the compost to shed this heat to the atmosphere as the longer heat path from the core of the compost to its outside surfaces improves the insulation of the compost heap.

Shape dictates the surface area to volume ratio of the compost and consequently the rate at which it sheds heat to the atmosphere. Compost with a large surface area to volume ratio will shed heat to atmosphere faster and consequently the compost temperature will be lower. Many commercial operations pile green waste in huge barrel shaped windrows, which although having huge volume have poor surface to area ratio. The consequence is low composting temperatures and its associated problems.

The most effective way of minimizing the surface area to volume ratio is to contain the compost in an equal sided cube which, in turn, dictates the need for a compost bin.

Practise has demonstrated that to efficiently produce compost aerobically, when that compost is contained in an equal sided cube, it is necessary to have a volume of about one cubic meter (1 $m^3$). It is possible for the volume to be smaller but no less than about 700 litres, as the efficiency of composting falls sharply with reduced volume, as the high composting temperatures are sustained for lesser times and the frequency and number of turns required for organic matter to become compost is substantially increased.

As a result of the problems inherent in transporting, warehousing and retailing compost bins of such large volume, there are no suitable bins being manufactured and distributed on a global basis; the fundamental requirement for the supply of lowest cost bins. Most commercially available compost bins have a volume in the range 100 litres (0.1 $m^3$) to 400 litres (0.4 $m^3$) with 200 litres (0.2 $m^3$) being the most common size. Such small volume renders these compost bins unsuitable for efficient aerobic composting, but has the important advantage for a consumer product of being portable. There is an absence of low cost portable compost bins of capacity suitable for efficient aerobic composting.

Most bins larger than 400 litres are not portable. One such compost bin is disclosed in U.S. Pat. No. 6,921,661 (Nagy). The compost bin has a structural frame, side panels, lower disposed access panels and a lid. In use, the contents of the bin are never turned and whilst there may be initial aerobic action, once the oxygen is exhausted the composting then becomes substantially anaerobic. New organic material is added at the top of the bin (a huge disadvantage, because all new organic material must be lifted up above the sidewall in order to be added to the top of the bin) and compost is removed near the bottom of the bin through the access panels adjacent its base. The side panels are not removed during operation, but rather they are installed during initial assembly and remain in place until the compost bin is disassembled.

Furthermore, in Nagy the structural frame comprises feet, posts and a top brace. In this structural frame the top brace is an essential structural element that prevents the posts from splaying apart. Its inclusion in a compost bin where its contents are never turned and where charging of the compost bin is exclusively through the top of the compost bin, does not disadvantage its anaerobic operation. However, it prevents this bin being used primarily for aerobic composting where the contents must be periodically turned. If the top brace of the Nagy compost bin was removed to allow unimpeded access to its interior through the side, the structural frame is no longer able to react to the loads imposed by the contents of the charged compost bin. Furthermore, in the structural frame of Nagy, the feet that extend between diagonally opposed posts, are important structural elements that are buried in the ground and disposed below the intended composted matter that will sit within the bin. As the ground itself is an essential structural element of the frame, the frame is neither freestanding nor readily portable. It also has the considerable disadvantage that it must be installed on flat prepared ground.

Portability is an important factor, as a bin must easily be moved to a site or to where the compost is to be used, or to where composting materials are located. It is also advantageous, to be able to set up and manufacture compost on the site of an intended new garden bed where the compost will inoculate the ground with microbes. The fact that aerobic compost bins are, by their nature large in volume, presents difficulties in this respect. Portability is impacted by the nature of the site and whether site preparation is required before bin installation. Many compost bins require a level (flat) site, which is problematic where there are only sloping/uneven sites available. Considerable labour and cost may be required to make a site flat. Some bins are designed to be transported to site in parts and then assembled, but site constraints may necessitate additional site work prior to assembly.

There are no prior art compost bins suitable for efficient aerobic composting that satisfactorily address the portability requirements. Those bins of larger capacity that are easily portable, all require installation and, in some cases, assembly on flat sites. The others are simply too heavy and bulky for easy movement.

The most efficient aerobic composting system utilises a series of bins joined together. This series of compost bins are long and typically require installation on flat ground, which further restricts the potential useable sites and/or greatly multiplies the cost of preparing suitable sites.

Once the contents of the compost have been raised to a high temperature it is essential that these high temperatures are maintained. The micro-organisms responsible for the breakdown of the organic matter in aerobic composting consume oxygen. The oxygen must be replenished, otherwise the aerobic micro-organisms cease to be active, the compost cools and organic material is decomposed by anaerobic micro-organisms.

With a large cubic volume compost pile there are long diffusion paths which the air must traverse to reach the centre of this pile. As composting progresses the organic matter shrinks in volume becoming denser and increasingly resistant to the diffusion of air. The way of dealing with this is to periodically turn the compost manually. This process breaks up the compost introducing new diffusion paths through the compost and directly distributes air throughout the compost. The ongoing time and physical effort required to periodically turn compost is the primary factor preventing the widespread adoption of aerobic composting. In consequence, despite its obvious disadvantages, anaerobic composting dominates the local production of compost simply because it does not need to be turned.

The issue of turning to maintain aerobic conditions is problematic given that turning requires the compost in one bin to either be removed and returned to the same bin or alternatively moved from one bin to another bin, which is labour-intensive, time-consuming and untidy.

An additional complication arises from the fact that compost adjacent the outer surface of the compost pile will be at or near atmospheric temperature. It is imperative that, when the compost is turned, this cool material is turned into the centre of the compost pile where it will be subject to temperatures high enough to sterilize the seed and pathogens. The smaller the surface area exposed to the atmosphere the smaller the volume of material adjacent the atmosphere that will not be exposed to temperatures sufficient to sterilize the seed and pathogens. The turning methodology must be such that it is capable of controlling the redistribution of compost from the low temperature zone to the higher temperature zones.

The problems inherent in the turning process have been addressed in an adaptation of a compost bin known as the New Zealand Box (see later) developed by Richard Wallis (a co-inventor in this patent application) and installed in the Lowther School in North Barnes, London SW13, UK in 2008. This adaptation is hereafter referred to as the "Kiwi Bin". In this system, four wooden posts, with longitudinally axially extending slots machined into adjacent sides of each post, are concreted into the ground. The concrete holds the posts and slots vertically, with the slots in adjacent posts aligned with one another and at the correct predetermined distance apart from one another. This enables removable slats to be inserted and removed from the posts, and ensures there is sufficient depth of engagement of the slat ends in the slots to prevent lateral disengagement.

The concreting of wooden posts into the ground produces a rigid framework of posts (to house the slats that form the sides of the compost bin), that is able to resist the forces produced by a large volume of compost material. If the framework is not rigid, these forces will push the posts apart and the slats will become disengaged from the slots and fall out.

The Kiwi Bin has the advantage that all the slats down to ground level can be removed allowing access to all sides of the compost heap for the purposes of turning the compost. Typically, this composting system will comprise two or more adjoining bins, and the compost will be turned from one bin to the adjoining bin. By removing all or most of the slats between the two bins and removing other slats from either bin as may be necessary, it is possible to conveniently rake or fork the compost from a first full bin to an adjoining empty bin, making optimal use of gravity, until the level of the compost is approximately equal in both bins. Thereafter, the residue of the compost from the first bin must be lifted from that bin onto the top of the compost in the receiving bin until the first bin is completely emptied. All the while, slats from either bin may be removed or reinserted according to the dictates of access to the contents of the first bin and retention of the contents of the receiving bin.

This is a more efficient process than the traditional process, in which it is necessary to shift all the compost from one module to the next by lifting it over the dividing wall between the modules. Furthermore, in the case of traditional bins, access to the contents to be turned is through one side only, whereas the Kiwi Bin allows "unimpeded access" from all sides.

The Kiwi Bin provides an efficient known way of turning compost which facilitates the movement of compost from the lower temperature zone into the higher temperature zone during turning. It utilizes gravity to minimise the lifting work required to turn the compost, and minimises the time required to turn the compost from one bin to an adjacent bin. Unimpeded access to all sides of the bin means two operators may simultaneously co-operate to turn the compost.

However, the Kiwi Bin has the major disadvantage that it cannot be moved because the compost bin is concreted into the ground. Further, there is considerable site investment cost in establishing such bins, as the ground must be flat and the posts must be securely and accurately located and concreted into the ground. Also, a Kiwi Bin is a permanent fixture and not easily removed. These factors mitigate against people trialing the process; an important factor if its efficient turning process is to become better known and widely accepted.

The significant investment in capital, time, skill and materials is required to establish a Kiwi Bin, its permanent nature, and the resultant dedicated land usage means its utility is limited. There is no prior art portable composting bin that eliminates the disadvantages of the Kiwi Bin (time and cost to establish, and permanence) while retaining the advantages of unobstructed access to the compost heap and speed and ease of turning.

Typical prior art "portable" compost bins are of a type known as the New Zealand Box originally described by Sir Albert Howard in his book "Farming and Gardening for Health and Disease (ISBN1849025215) or variations thereof (for example www.askorganic.co.uk). Typically, these bins are four sided and have posts supporting three permanently fixed sides of the bin, and a permanently fixed member located below removable slats on the remaining side of the bin. This provides limited access to the content of the bin from one side only.

This limited access is useful to load and empty the bin, and is particularly suitable for anaerobic composting where no turning is required. However, this type of bin has limitations if the compost is to be regularly turned to maintain aerobic composting conditions.

In the case of a single bin the slats on the fourth side are removed to allow compost to be raked or forked out onto the ground, turned and forked back into the bin. In the case of two adjacent bins, the contents of a full bin are turned either by forking the entire contents over a fixed dividing wall between it and the receiving bin, or by forking the entire contents onto adjacent ground and then forking it from there into the receiving bin. Both processes are time and labour intensive, and the effort involved in turning the compost in this style of bin is beyond the tolerance of most would be household composters, and costly to those composting commercially generated organic waste.

Further, the constructional details of these bins means they are generally sold as an assembled unit which limits their distribution to areas close to their point of manufacture. Furthermore, whilst many of these bins are not concreted into the ground, they are nevertheless not easily moveable because of their weight and bulk; due to the low structural efficiency in their design. The result is heavy compost bins that are difficult to move, and to set up where the ground is uneven or sloping.

Other prior art solutions address the issue of portability by providing a bin which typically has removable slats on all fours sides of the bin which interlock with the posts to form a structure. The wooden compost bins produced by The Recycle Works (www.recycleworks.co.uk) are typical. These bins, use wooden slats removable fitted to posts using fittings attached to the ends of the slats. In this bin, structural integrity is achieved by the combined effect of multiple slats each restraining the position of the posts, and they also require the support of level ground to maintain their integrity, and therefore are not free standing. If the slats are removed from any two sides, the structural integrity of the bin is lost. For this reason, these bins do not allow, unimpeded access to the interior contents of the bin and are not optimal for the efficient turning of their contents. These bins are best suited to anaerobic composting. Furthermore these bins cannot be used on a sloping site, as the entire site must be flat, as all bins (modules) must sit at the same level.

Many commercial operations seek to minimize the cost of turning compost by employing mechanical turning means such as tractors. Typically these operations use windrows that provide easy access for the tractor or other specialized turning equipment. However, these windrows have poor surface to volume ratios with consequent lower composting temperatures and substantial volumes adjacent the surface of the compost pile that are at temperatures too low to sterilize seeds and pathogens. The mechanical turning means has poor control of the turning operation and is unable to ensure that this material is turned into a high temperature zone. This method of composting is well known to produce compost with viable seeds which has adverse practical and legal implications; all consumers of compost require weed free compost. Furthermore, the lower temperatures reached inside the compost are not sufficiently high to effectively compost manufactured items such as disposable Polylactic Acid coffee cups.

Furthermore, it is difficult to control the flow of rain and ground water through the windrows and they commonly produce leachate contamination. As it is effectively impossible to vermin proof these windrows, they must be located in areas where the presence of vermin is acceptable; effectively ruling out local composting.

A characteristic of prior art commercially available aerobic compost bins of volume sufficient to facilitate efficient aerobic composting is the universal use of wood as the primary construction material. This has the disadvantage that unless the wooden components are subject to regular application of protective coatings, they are subject to rotting and attack by pests, including the micro-organisms that break down the compost. They have the further disadvantage that wooden compost bins are not easily exported to other countries where certain prohibitions exist to control the spread of timber borne pests.

The compost bin of the present invention seeks to address the shortcomings in existing aerobic compost bins. The invention provides a freestanding compost bin that can offer volume, with low surface area to volume ratio, suitable for efficient aerobic composting, that can be efficiently manually turned, that can be vermin proofed, that can control the flow of water through the compost, that can be readily manufactured in high production volumes with consequent low cost, that can be easily shipped and warehoused at low cost, that can be readily exported without quarantine restrictions, that can be easily assembled off site, that is easily portable, that has zero site preparation costs, that has high durability without the requirement for periodic maintenance, that can be easily combined to form multiple bins that facilitate the highly efficient turning of the compost in a manner suitable for commercial operations.

It is therefore an object of the invention to provide a compost bin that overcomes at least one or more problems or disadvantages of existing compost bins, or to at least provide a useful alternative to existing compost bins.

SUMMARY OF THE INVENTION

According to a first aspect the present Invention consists of a compost bin module for aerobic decomposition of organic matter, said module in the form of a container comprising a free-standing portable structural frame for seating on or above the ground, sidewalls all of which are removable, an open top and open bottom, each of said removable side walls insertable into said structural frame and laterally restrained thereby, wherein said structural frame comprises at least three spaced-apart posts, at least an equal number of structural members to said posts spanning between and interconnecting said posts, each of said structural members spanning between two adjacent posts at or near their base, and all of said structural members interconnect said posts at or near the base of said posts.

Preferably said removable sidewalls are insertable into axially extending slots integral with said posts, said axially extending slots located immediately above said structural members.

Preferably at least one of said removable side walls is a plurality of slats.

Preferably said compost bin module is removably connectable to a like compost bin module using connector means thereby forming a compost bin assembly.

Preferably said connector means allow for said structural frame of said compost bin module to be connected to the structural frame of a like compost bin module in movable engagement, so that they slide relative to each other in a substantially vertical direction.

Preferably when said compost bin module and like compost bin module are connected to each other they are vertically displaced to each other.

Preferably at least two of said posts of said compost bin module have mating faces which are abutted and secured against the mating faces of at least two respective like posts of said like compost bin module to form at least two pairs of abutted posts.

Preferably said mating faces of at least one of the pair of abuued posts each have axially extending re-entrant grooves.

Preferably an axially extending joining strip spans between and engages with said axially extending re-entrant grooves.

Preferably said at least three spaced apart posts are four posts, and said at least an equal number of structural members to said posts is four structural members.

Preferably at least a portion of said structural frame is hollow.

Preferably at least portion of said structural frame is made from extruded aluminium.

Preferably said structural member has upper and lower faces and at least one axially extending boss adjacent each of said upper and lower faces and ends perpendicular to the longitudinal axis of said structural member, said axially extending boss being tapped at each end.

Preferably the volume of said container is greater than seven hundred litres.

Preferably said compost bin is provided in a ready to assemble kit.

Preferably in use with said side walls removed from said structural frame, a person can stand inside said structural frame and hold said structural members so as to be able to lift and transport said structural frame.

According to a second aspect the present invention consists of a compost bin assembly system for aerobic decomposition of organic matter, said system comprising: a plurality of compost bin modules; each module in the form of a container comprising a free-standing portable structural frame, removable sidewalls, an open top and open bottom, each of said removable side walls made up of at least one component insertable into said structural frame and laterally restrained thereby; and a plurality of connector means for interconnecting said plurality compost bin modules when said modules are abutted against each other in side-by-side or end-to-end relationship, and said structural frame of each module comprises at least three spaced-apart posts, at least an equal number of structural members spanning between and interconnecting said posts, with each of said structural members at or near the base of said posts.

Preferably said connector means allow for said structural frames of at least two of respective said compost bin modules to be connected together in movable engagement, so that they slide relative to each other in a substantially vertical direction.

Preferably when at least two said compost bin modules are abutted and connected to each other they are substantially horizontally displaced to each other.

Preferably said at least one component is a plurality of slats.

Preferably in use with said sidewalls removed from said structural frame, a person can stand inside said structural frame and hold said structural members so as to be able to lift and transport said structural frame.

According to a third aspect the present invention consists of a free-standing portable structural frame for a compost bin module used for aerobic decomposition of organic matter and having side walls all of which are removable, wherein said side walls of said compost bin module are insertable into said structural frame and laterally restrained thereby, said structural frame comprising four spaced-apart posts and at least four structural members spanning between and interconnecting said posts, and each of said structural members spanning between two adjacent posts at or near the base of said posts, and all of said structural members interconnect said posts at or near the base of said posts.

Preferably said structural frame is removably connectable to a like structural frame of another compost bin module using connector means.

Preferably said connector means allow said structural frame to be connected to said like structural frame in movable engagement, so that they slide relative to each other in a substantially vertical direction.

Preferably said structural member has upper and lower faces and at least one axially extending boss adjacent each of said upper and lower faces and ends perpendicular to the longitudinal axis of said structural member, said axially extending boss being tapped at each end.

According to a fourth aspect the present invention consists of a compost bin module for aerobic decomposition of organic matter, said module in the form of a container comprising a free-standing portable structural frame for placement on or above the ground, sidewalls all of which are removable, each of said side walls insertable into said structural frame and laterally restrained thereby, wherein said structural frame comprises four spaced-apart posts, at least four structural members spanning between and interconnecting said posts, each of said structural members spanning between two adjacent posts at or near the base of said posts, and all of said structural members interconnect said posts at or near the base of said posts, and said compost bin module removably connectable to a like compost bin module using connector means thereby forming a compost bin assembly.

Preferably said connector means allow for said structural frame of said compost bin module to be connected to the structural frame of a like compost bin module in movable engagement, so they slide relative to one another in a substantially vertical direction.

Preferably when said compost bin module and like compost bin module are connected to each other they are vertically displaced to each other.

DETAILED DESCRIPTION OF PREFERRED EMBODIMENT

Figure 1:
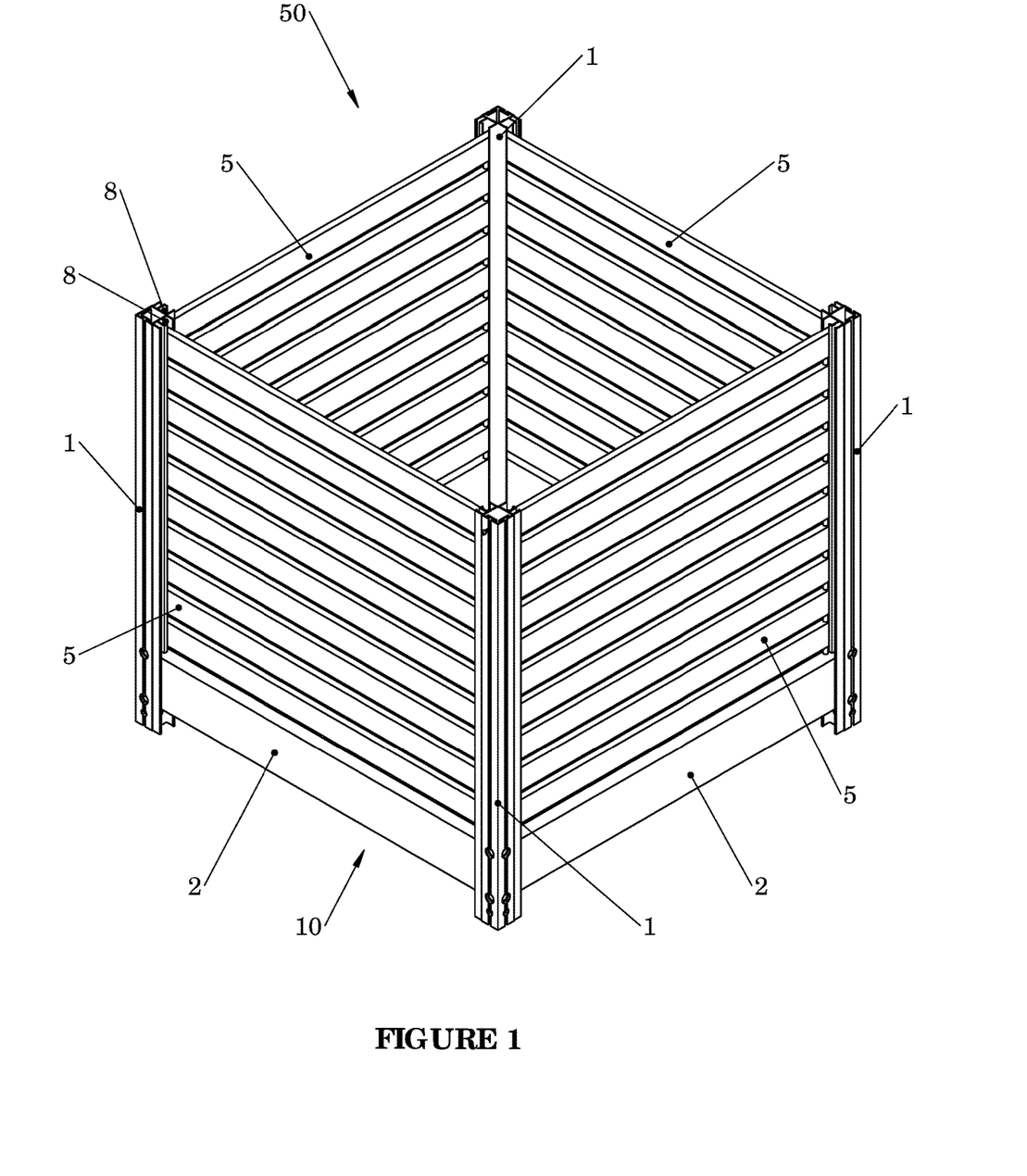
FIG. 1 shows one embodiment of the aerobic compost bin of the invention.
Figure 2:
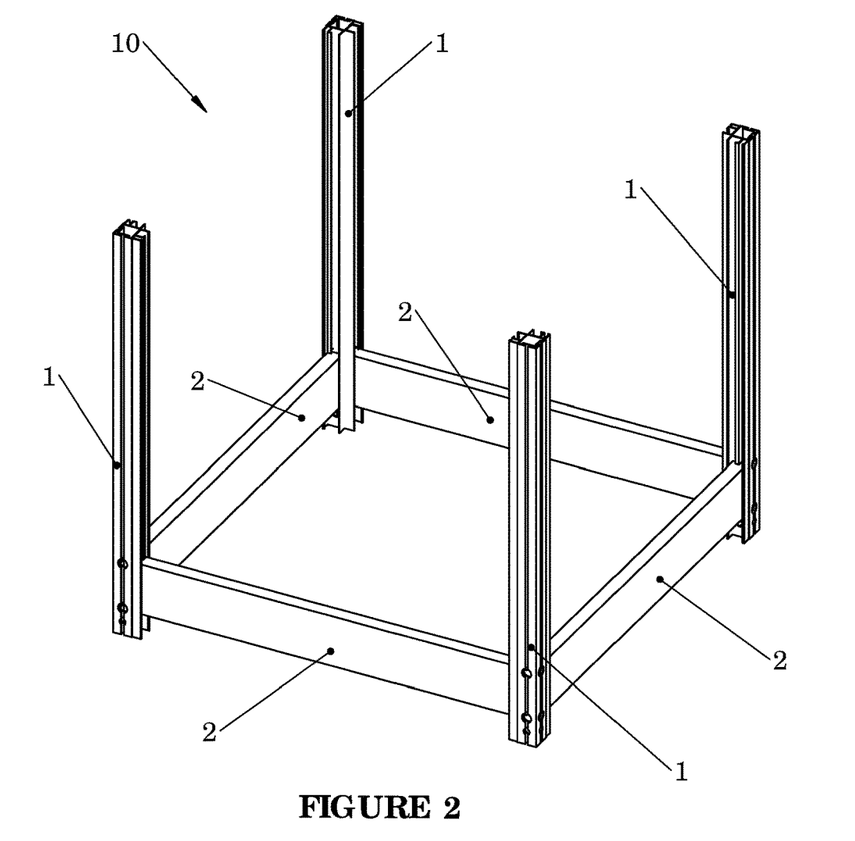
FIG. 2 shows structural frame of the compost bin of FIG. 1.

In a first embodiment of the invention, a compost bin module 50 for acerbic decomposition of organic matter, in the form of a "container", is shown in FIG. 1. It comprises a portable structural frame 10 and removable slats 5. Structural frame 10 is shown in FIG. 2 and is intended to be placed on or above the ground. Structural frame 10 comprises posts 1, structural members 2 and attachment means that secure structural members 2 to posts 1. Four posts 1 are located relative to each other and spaced apart by four structural members 2 connected to posts 1 at or near the base of post 1. The ends of removable slats 5 are located in axially extending slots 8 formed in posts 1 immediately above the structural members 2. Slats 5 are a clearance fit in slots 8 and can be removed by sliding upward through slots 8. Adjacent slats 5 are typically spaced relative to one another such that there is air access to the composting material through the sides of the compost bin. This provides a pathway for air to diffuse into the interior of the composting material and replenish the oxygen consumed by the aerobic microbes.

The structural members 2 may take many different forms. However, they all span between, and are attached to, adjacent posts 1 at or near the base of posts 1. In the embodiment shown in FIG. 2, the posts 1 and structural members 2 are both hollow and use materials of high stiffness; typically extruded aluminum.

Figure 3:
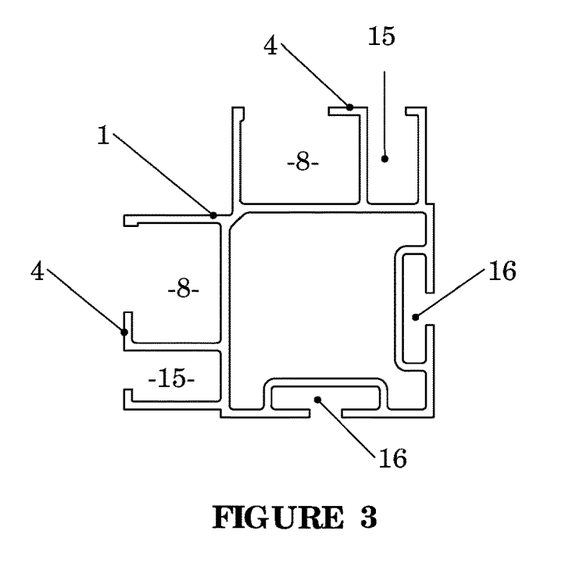
FIG. 3 is an end view of the posts used in the frame of FIG. 2.

FIG. 3 shows the end view of post 1. It has a substantially square-shaped main body portion with axially extending slots 8 formed on two adjacent sides of post 1 outboard of the hollow square main body. In the event bin module 50 is required to be vermin proof, additional slots 15 may be incorporated to house a mesh (not shown) outboard of axially extending slots 8. It will be appreciated this mesh together with the addition of suitable mesh (not shown) adjacent the base and the top of the structural frame 10 will create a vermin proof container. Re-entrant axially extending grooves 16 incorporated into the other two adjacent sides of post 1, inboard of the hollow main body, are used to tie adjacent compost bin modules 50 to each other. This arrangement allows the same post to be used at all corners of structural frame 10.

Figure 4:
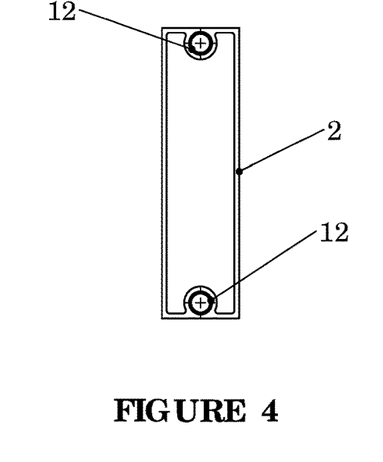
FIG. 4 is an end view of the structural members used in the frame of FIG. 2

FIG. 4 shows the end view of structural member 2. Structural member 2 comprises a hollow rectangular rail that spans between adjacent posts 1. The end faces of structural members 2 are perpendicular to its longitudinal axis. Structural member 2 also comprises hollow bosses 12 located adjacent its upper and lower surfaces. Hollow bosses 12 are tapped at each end.

Figure 5:
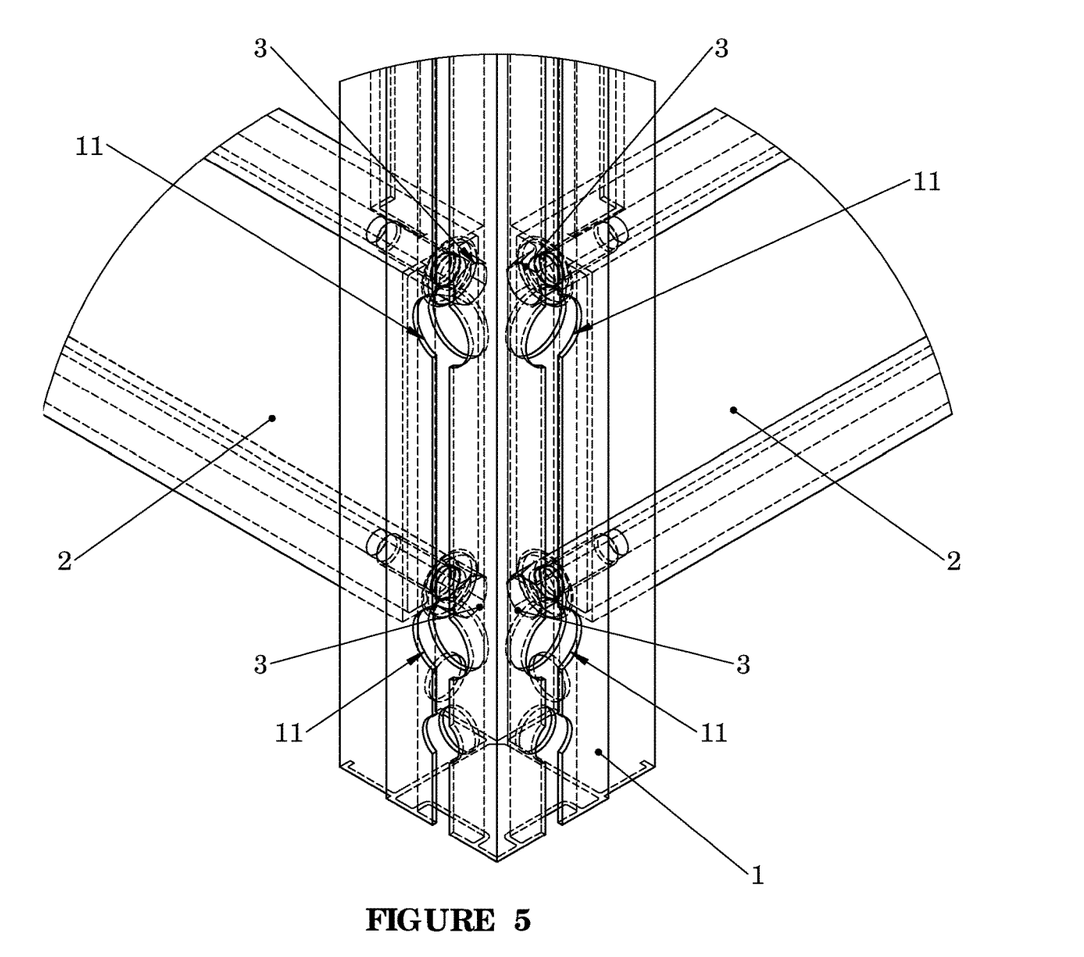
FIG. 5 is a close-up view of the connection of structural members to a post of the structural frame of FIG. 2.
Figure 6:
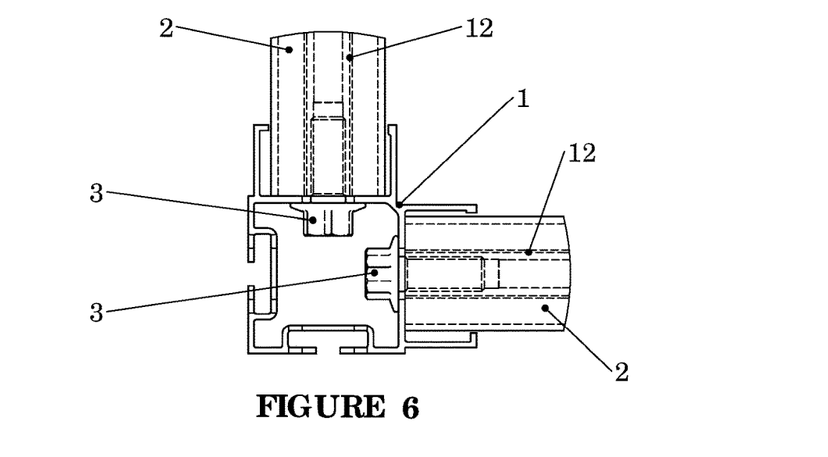
FIG. 6 is an end view of one corner of the frame showing details of the connection between the post and the structural members used in the structural frame of FIG. 2

FIG. 5 shows typical details of the attachment means connecting structural members 2 to the bottom of post 1. The ribs 4 forming one wall of slots 8 have been locally removed adjacent the bottom of posts 1 to allow the end of structural member 2 to butt up against the side of post 1. Structural members 2 are pulled into compressive contact with the side of post 1 by attachments means comprising bolts 3 that are screwed into the tapped holes in the end of hollow bosses 12. Access holes 1 in post 1 provide access to assemble bolts 3. Once bolts 3 are tensioned the geometry of structural support member 2 ensures that adjacent posts 1 are held parallel to one another and perpendicular to the longitudinal axis of support member 2. Importantly, this provides a free standing structure that facilitates the easy (without sticking) insertion or removal of slats 5 into slots 8 whilst always ensuring slats 5 are laterally restrained by slots 8.

The purpose of structural frame 10 is to react all the loads generated in the establishment of the composting facility and its operation, whilst simultaneously preserving its own spatial geometry which is essential for the correct functioning of bin module 50.

The principal force incurred in the composting operation, arises from the natural tendency of a pile of organic waste or composting material to slump and spread outwards. In compost bin module 50 slumping of the compost material (not shown) is resisted by the presence of slats 5. The lateral load, imposed on slats 5 by the slumping composting material, is reacted by posts 1 of structural frame 10 and acts to push the posts 1 apart, thereby increasing the distance between the slots 8. In the event displacement of slots 8 is too great, the ends of slats 5 will no longer be engaged in slots 8 and the slats 5 will fall out of structural frame 10.

Other forces include those imposed by the operator during transport, installation and the turning of the compost, impacts by the operator or machinery that come into accidental contact with the compost bin and racking forces that occur when the surface supporting the feet of posts 1 are out of plane.

For the purposes of this specification, "structural frame" means a collection of structural members (posts and beams) that are permanently fixed to one another and are solely responsible for reacting all loads incurred in transportation, installation and operation of compost bin 50.

The utility of bin module 50 compared to all other portable compost bins is derived from the ability to obtain "unimpeded access" to the interior of bin module 50 from all sides, whilst simultaneously maintaining the structural integrity thereof. By locating all the structural elements, apart from posts 1, adjacent the bottom of the compost bin, the operator can readily access the interior of bin module 50 by simply stepping over a structural member 2. This facilitates the easy movement and placement of compost bins in all terrains and the most efficient means for turning the compost.

This is entirely different from all other prior art portable compost bins where the structure prevents unimpeded access to the interior of such bins from all sides. In most prior art compost bins the sidewalls are an integral part of the structure on at least three sides of the bin and are permanently fixed to the posts on these three sides. In other prior art bins (e.g. the Recycle Works bin) where the sidewalls are removable, their removal causes the bin to lose its structural integrity. In those isolated instances where the compost bin has a frame separate to the sidewalls, they have structural elements at or near the top of the post which obstructs unimpeded access to the interior of the compost bin (e.g. the "anaerobic" Nagy bin).

Compost bin module 50 is inherently less structurally efficient than those of prior art compost bins and consequently its structure must react to far higher loads then those experienced with prior art compost bins. In conventional bins the action of the compost to push the posts apart is reacted by members in tension. In the Nagy compost bin, for example, the top brace prevents the posts being pushed apart by a simple tension load in the top brace.

In bin module 50 all loads on posts 1 are reacted by bending in structural members 2 and posts 1. This typically increases the internal forces in the compost bin by a factor of ten or more compared to those in prior art compost bins and a reduces the stiffness of the structure by a factor of one hundred and fifty or greater. The huge increase in the internal loads and the massive reduction in the stiffness inherent in this embodiment of the present invention have road blocked innovation in this area. The huge increase in the forces that the structure must absorb and the necessary massive increase in stiffness of the structural elements, if the spatial geometry of the compost bin is to be preserved, means an entirely different approach to the design of the compost bin is required. In-particular, the structural elements must have a stiffness and strength far greater than those materials traditionally used in compost bins to that more characteristic of metals. Even this only goes part way to resolving the stiffness issue; it is insufficient in itself to create a compost bin with the same stiffness as conventional compost bins.

Consequently, bin module 50 is designed to accommodate this inherent lack of stiffness. The depth of slot 8 is made much deeper than that needed simply to accommodate slats 5 and restrain them laterally. This additional depth typically allows the top of posts 1 to deflect under load±10 mm from it's no load position to accommodate deformation of the structural frame 10 whilst still providing lateral restraint for slats 5.

Further as the forces on post 1 produce a maximum bending moment adjacent structural member 2 which is reacted by structural member 2, the stiffness of the structural frame 10 is critically dependent on the stiffness of the joint between post 1 and structural member 2. This joint shown in FIG. 5, is very stiff due to the high stiffness of the materials and the pre-tensioning means used to secure the structural member 2 to post 1.

The extruded aluminium posts 1 and structural members 2 can be readily made in high volume at low cost. Furthermore, they are readily packaged in a flat pack of small volume that facilitates low shipping and warehousing costs and easy transportation from the point of sale. The component parts of structural frame 10 are immune from attack from weather and organisms and pests that are present in the compost, require no maintenance and are free from quarantine restrictions. The structural frame 10 is easily assembled using only an Allen key or socket.

Figure 7:
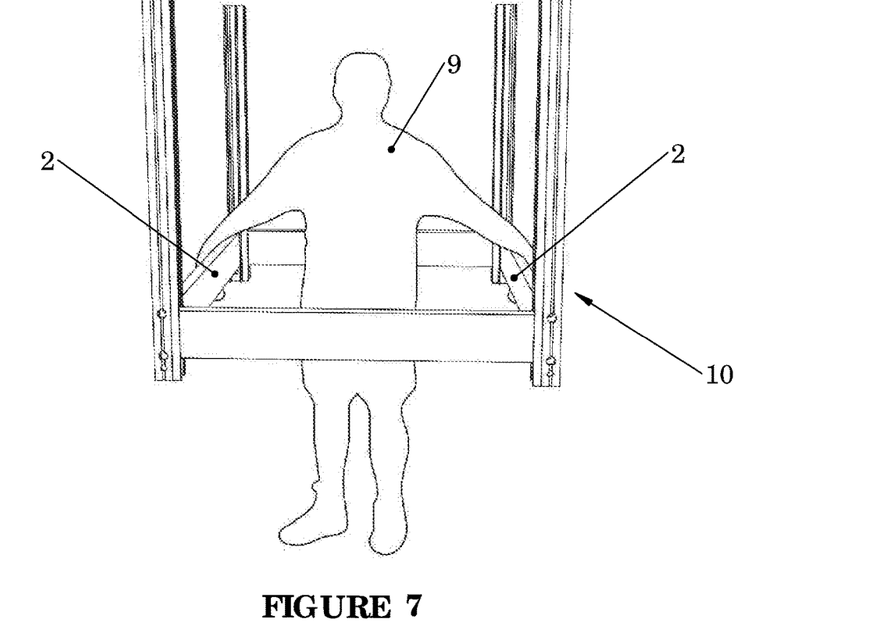
FIG. 7 shows a person lifting the structural frame of FIG. 2 for transportation to its operating location.

FIG. 7 demonstrates the utility of this arrangement when the compost bin is being setup; it shows a person 9 transporting structural frame 10 to its desired location. The structural frame 10 is an extremely light free-standing structure (typically less than twenty kg) with small bulk that is easy for a single adult person 9 standing inside structural frame 10 to pick up by holding opposed structural members 2 and transport over difficult terrain.

Figure 8:
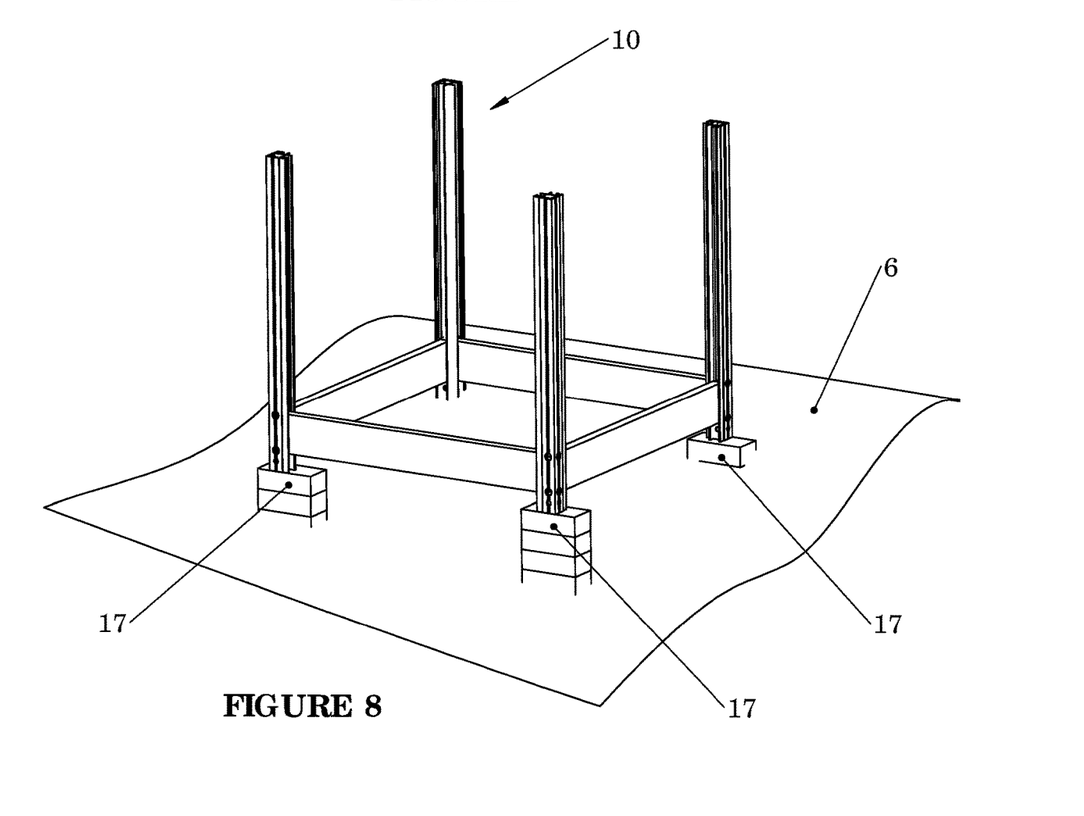
FIG. 8 shows the structural frame of FIG. 2 installed on sloping ground at its operating location.

Furthermore, it requires no site preparation as it is very easy for a single person to setup even on difficult sloping sites. FIG. 8 shows structural frame 10 positioned and leveled on sloping ground 6. The low weight and free-standing nature of structural frame 10 means that, once positioned in the desired location, a person 9 can easily support structural frame 10 whilst simultaneously placing packing 17 such as bricks or other similar packing products under posts 1 until structural frame 10 is approximately horizontal. As will be appreciated, a compost bin assembly 100 of the invention may be constructed in modular format thereby enabling a first bin module 50a to be connected to a second bin module 50b. Indeed, it is highly desirable that the compost bin assembly 100 comprises several bin modules 50 because it is with compost bin assemblies containing at least two bin modules 50 that maximum turning efficiency (i.e. the lowest effort and time expended to turn the compost) may be achieved as will be evident from the following description.

Figure 9:
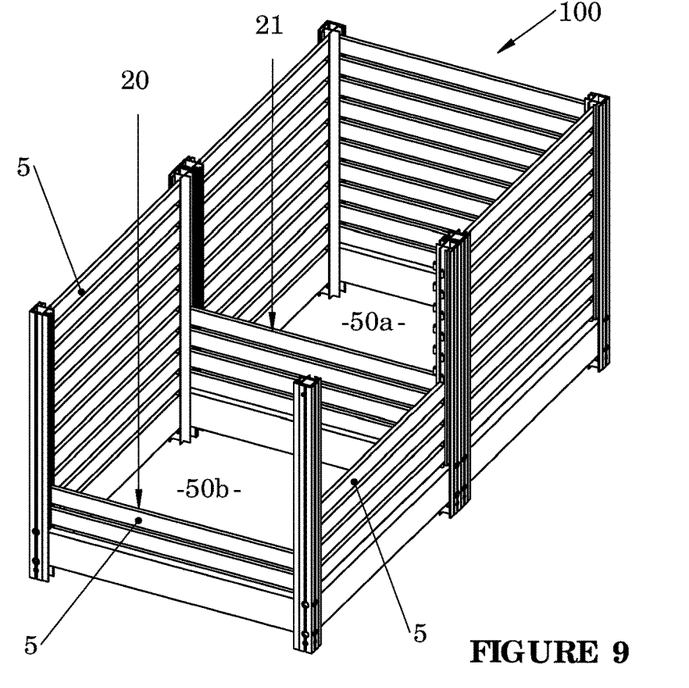
FIG. 9 shows a compost bin comprising two modular bins.

FIG. 9 shows compost bin assembly 100 comprising two bin modules 50a, 50b. Slats 5 have been removed from the initially empty second bin module 50b and from the dividing wall 21 separating first bin module 50a and second bin module 50b. When in use, one bin module may initially be full of composting matter (not shown) and the other bin module may initially be empty. The compost turning process involves transferring the composting matter from the initially full first bin module 50a to the initially empty second bin module 50b. The transfer may be achieved in three phases.

In "phase 1" the top third or more of the compost heap is raked from the initially full first bin module 50a onto the floor and as far as possible against the back wall 20 (i.e. the wall opposite the dividing wall 21 that separates first bin module 50a from second bin module 50b) of the initially empty second bin module 50b so as to form a batter (not shown). In this first phase gravity does most of the work.

"Phase 2" involves progressively removing slats from the external sides of first bin module 50a and progressively replacing slats in the external sides of second bin module 50b while forking composting material from first bin module 50a into second bin module 50b and throwing it towards the back wall 20 of second bin module 50b so as to build on the existing batter. The ability to remove slats from all sides of first bin module 50a means that two people located on opposite sides of bin module 50a can simultaneously work to fork the compost from first bin module 50a to second bin module 50b; an important consideration in work places where health and safety considerations often prevent people working on their own.

Figure 10:
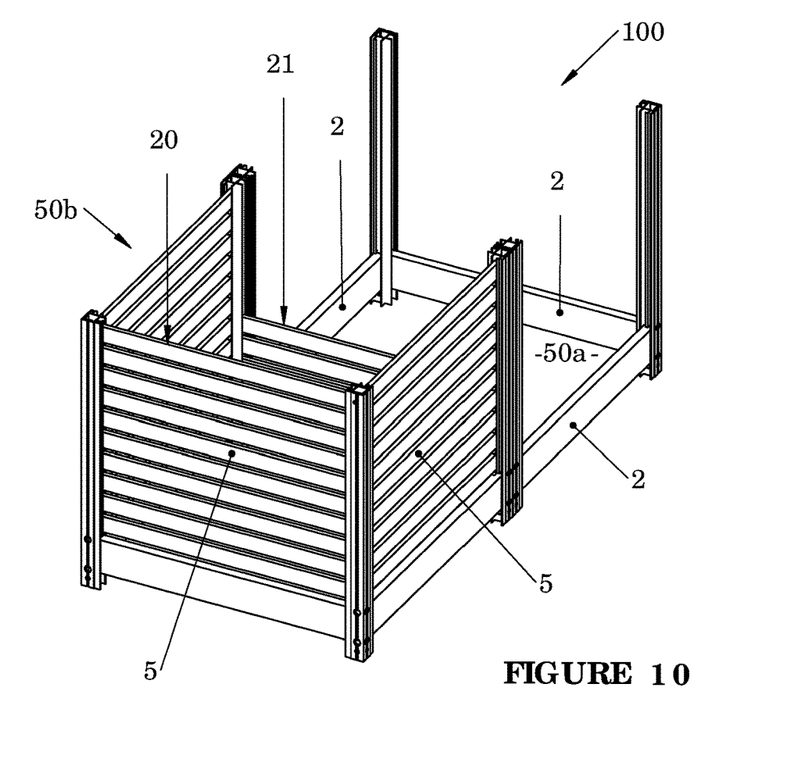
FIG. 10 shows an alternative configuration of the compost bin of FIG. 9.

"Phase 3" occurs after the batter has become so steep from the addition of composting material that it starts to spill composting material back into first bin module 50a. FIG. 10 shows the arrangement during Phase 3. Slats 5 from the external side of first bin module 50a have been completely removed to provide unencumbered access to the interior of first bin module 50a. In Phase 3 slats 5 in the dividing wall 21 are progressively inserted to raise the height of dividing wall 21 and thus prevent the composting material from spilling back into first bin module 50a as it is further emptied. The operator may elect to leave in place the residue confined within the area bounded by the structural support members 2 of first bin module 50a. This residue being microbe rich, may be mixed with and inoculate the next batch of organic matter that is loaded into the now vacant first bin module 50a.

It will be appreciated that the operator is able to organise the turning operations described in Phases 1 to 3 such that the cooler compost material residing adjacent the exterior surfaces of first bin module 50a are turned into the central hot zone of second bin module 50b, thus ensuring all the compost material is exposed to temperatures sufficiently high to sterilize the seeds and pathogens contained in the compost material.

As will be apparent, the compost bin assembly comprising bin modules 50 of the present invention has the significant advantage of minimising the work needed to turn the compost. During phase 1 no lifting work is required to transfer composting material from first bin module 50a to second bin module 50b. During phases 2 and 3 the amount of lifting work is a function of the height of dividing wall 21. The lifting work done is minimised by varying the height of dividing wall 21 throughout phases 2 and 3, such that the wall height is always a minimum consistent with preventing composting material from second bin module 50b falling back into first bin module 50a. Turning is more efficient than in traditional prior art bins with fixed dividing walls where the entire contents of a full prior art bin must be lifted over the full height of the fixed dividing wall.

It will be evident from the above description that the efficiency of the turning process depends largely on the ability to remove or replace slats 5 from any side of either module as the turn progresses and the need arises.

Figure 11:
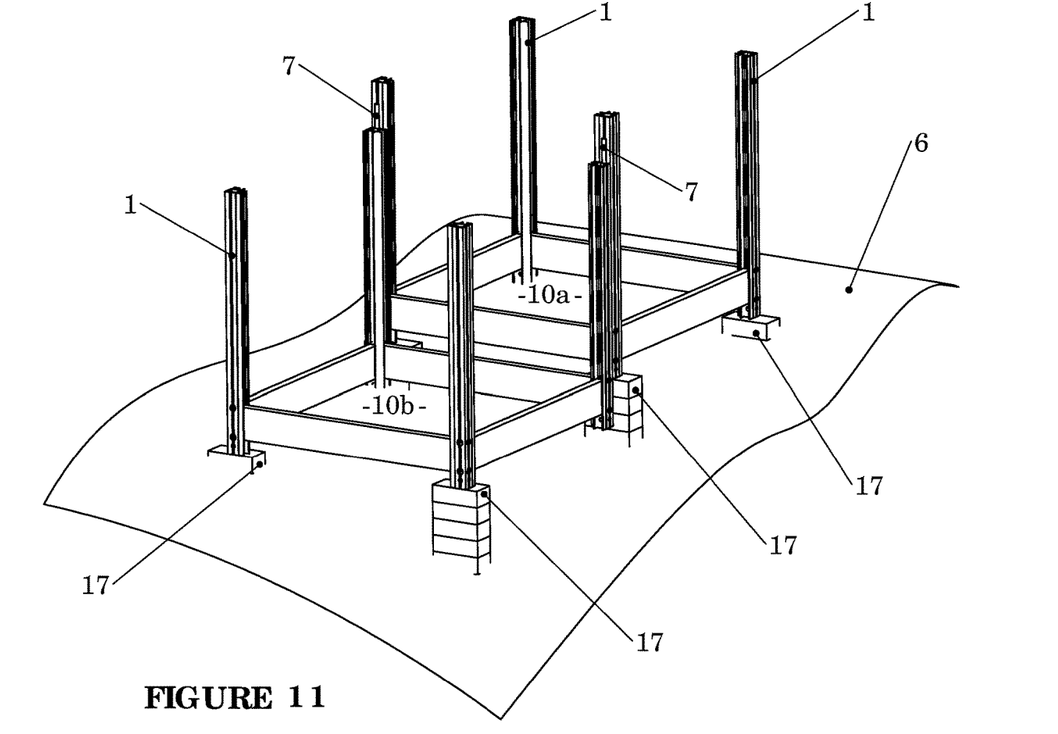
FIG. 11 shows the structural frames (of FIG. 2) of a compost bin comprising two modular bins positioned on sloping ground.

An important feature of this invention is the ability to position several bin modules 50 on sloping ground without the need for site preparation. FIG. 11 shows the structural frames 10a,10b of two bins configured to be located on sloping ground 6. In this arrangement second frame 10b is located immediately adjacent to first structural frame 10a at a level that suits the terrain on which second structural frame 10b is standing.

Joining pieces 7 are used to tie posts 1 of adjacent structural frames together in a manner that allows adjacent structural frames 10a,10b to move vertically relative to one another, whilst simultaneously restraining adjacent structural frames 10a,10b from moving relative to one another in the horizontal plane.

Figure 12:
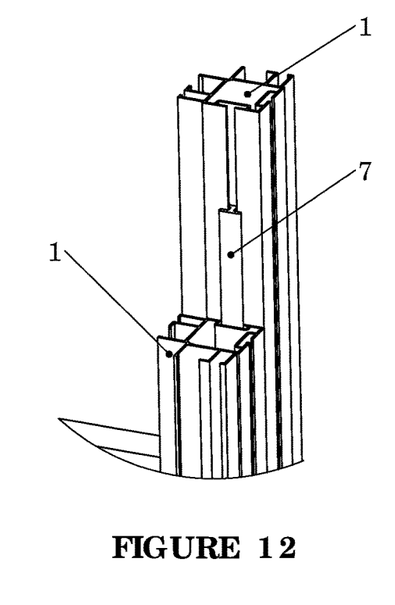
FIG. 12 is a close up view of one corner of the abutting structural frames of FIG. 11 showing details of the connection between these two structural frames.
Figure 13:
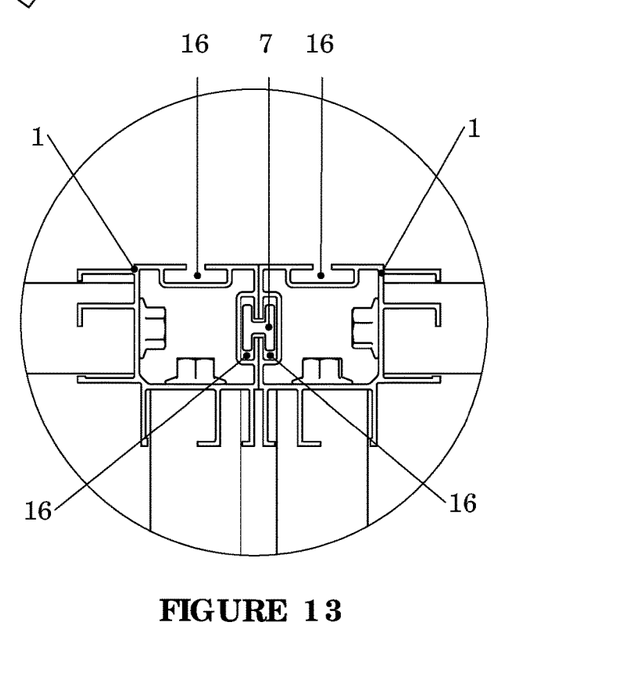
FIG. 13 is an end view of the abutting posts of adjacent structural frames shown in FIG. 12.

FIG. 12 shows a close up view of the top of adjacent posts 1 and FIG. 13 shows the end view of two adjacent posts 1 tied together by joining piece 7 which is housed in re-entrant axially extending grooves 16 formed in the mating faces of abutting post 1 of the first and second structural frames. This joining arrangement allows structural frame 10b to be raised and lowered relative to a structural frame 10a, which facilitates the easy joining together of two or more structural frames 10 by a single person even on sloping sites.

Alternative joining arrangements utilising the re-entrant axially extending grooves 16 located on the outside of posts 1 can be devised that offer the same functionality.

Structural frames 10a,10b may be transported to the site where first structural frame 10a is positioned on the site with at least one post 1 in contact with ground 6 and leveled by placing suitable packing 17 under the feet of the remaining posts 1 as required. Second structural frame 10b is positioned adjacent first structural frame 10a such that posts 1 of these adjacent structural frames are aligned and at least one post 1 is in contact with the ground. The second structural frame 10b is leveled by placing suitable packing 17 under the feet of those posts 1 not in contact with the ground. Joining piece 7 is then inserted into re-entrant axially extending grooved 16. Alternatively after first structural frame 10a is installed on site, the second structural frame 10b may be offered up to the abutting posts 1 of first structural frame 10a and temporarily clamped together, whilst joining pieces 7 are inserted into grooves 16.

Figure 14:
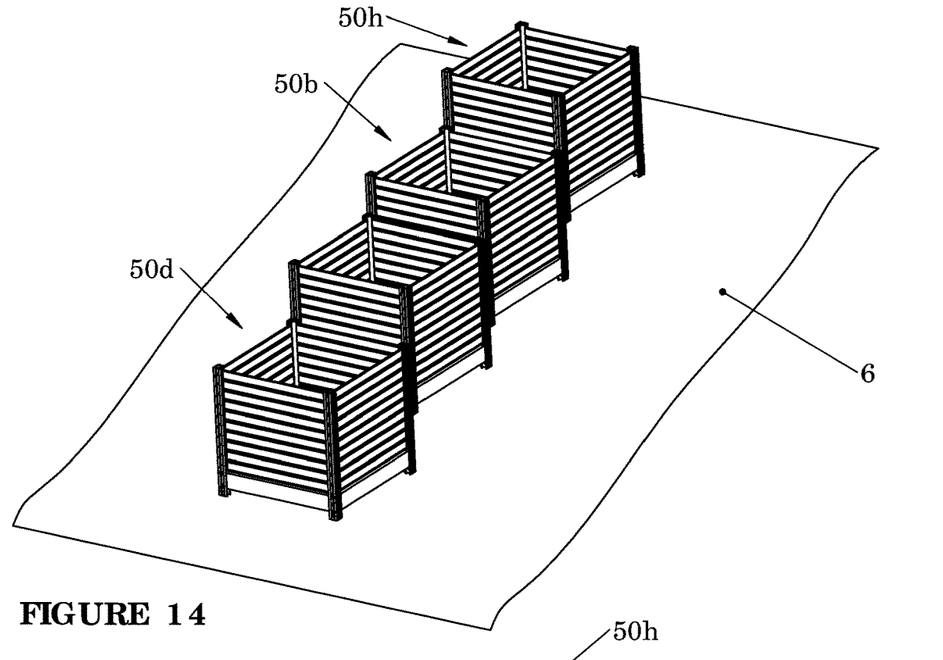
FIG. 14 shows a compost bin comprising four modular bins of FIG. 2 positioned on sloping ground.
Figure 15:
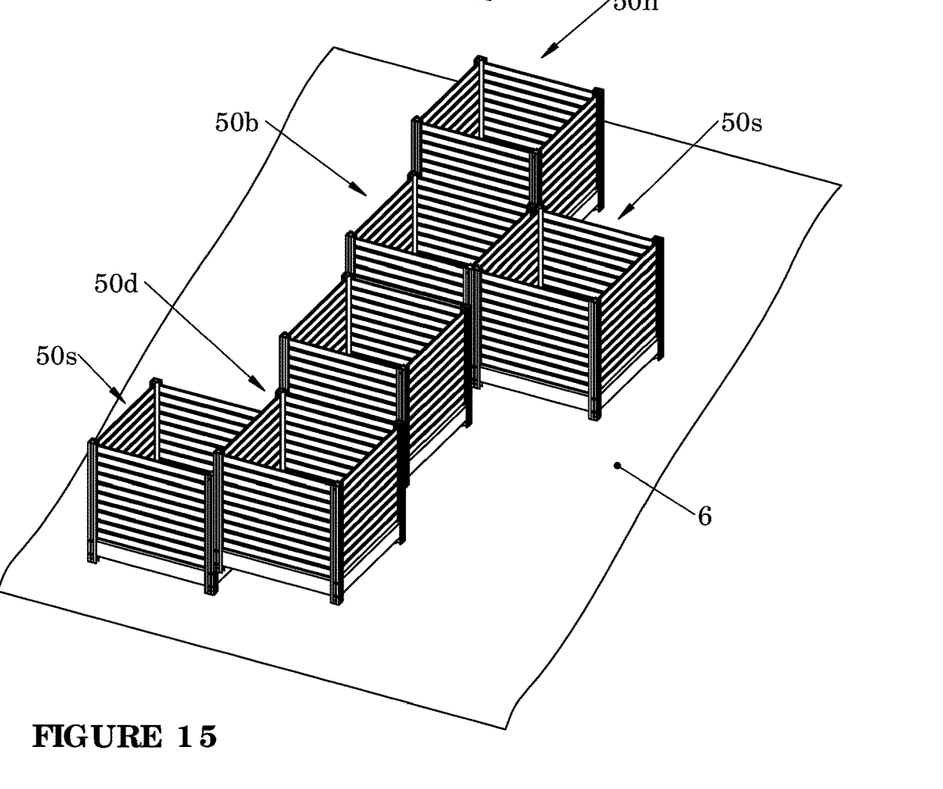
FIG. 15 shows a compost bin comprising six modular bins of FIG. 2 positioned on sloping ground.

A compost bin assembly containing numerous bin modules 50 may be constructed in this fashion. FIG. 14 shows a sloping site where each successive bin module 50 has been positioned lower than the preceding module producing an arrangement that facilitates particularly efficient turning with very low expenditure of work. Organic matter can be loaded into the highest bin module 50h. When turning is required the operator can simply rake composting material from this bin module 50h into the adjacent lower bin 50b until the levels in both bins are approximately equal. Any remaining composting material in the upper bin may then be forked into the lower bin. Provided sufficient modules are installed, the composting material can periodically be turned from its bin into the adjacent lower bin until after a number of turns the completed compost occupies the lowest and last bin module 50d in the chain. FIG. 15 shows an arrangement where additional bin modules 50s have been added to each side of the compost bin shown in FIG. 14. It will be evident that bin modules 50 may be arranged together in any desired pattern.

The foregoing description is applicable to a configuration of two or more bin modules 50. When a smaller scale of composting is required (e.g. say in small domestic back yards) a single bin module 50 may be used which, although being less efficient for turning purposes than a dual or multi-bin configuration, will nevertheless still be more efficient to turn, than any other conventional compost bin.

It is desirable to avoid having to turn the contents of a single bin module 50 out onto the ground and fork it back in again. This is labour intensive and time consuming because it requires the whole heap of composting material to be shifted twice (out and in again) mostly working against the force of gravity. It is also messy because once the composting material has been turned out onto the ground it is difficult to manage and tends to get spread around. The compost bin module 50 of the present invention, with its removable slats 5 on all sides, allows the composting material to be efficiently turned in situ even as a single module.

An important enabling feature for in situ turning is the fact that the size (and therefore height) of the composting material has shrunk significantly during the aerobic composting process creating room for material to be stacked on top of the existing composting material. In addition the consistency of the partially composted organic material is such that it will stack and largely retain its integrity thus allowing it to be stacked above the top of the bin.

In this procedure the operator removes sufficient slats 5 from one side of bin module to enable him to comfortably fork out the contents of one corner while standing outside bin module 50 adjacent that corner. Depending on the height of the operator and the bin module this generally requires slats 5 to be removed down to the mid height of posts 1. The operator then forks the contents of the first corner of bin module 50 onto the top of the two corners immediately behind it (i.e. the third and fourth corner). It is not necessary to dig the first corner out right down to the ground because the bottom third can be aerated by twisting the fork through that remaining composting material without having to actually remove it.

The contents of the adjacent second quarter are then progressively collapsed into the first corner until this material starts to spill out of the compost bin over the top of slats 5. Composting material is then forked out onto the top of the third and fourth corners until the remaining composting material can be easily aerated by twisting the fork through it. The slats 5 are then replaced and composting material from the top of the third and fourth quarter is raked into the first and second quarter. This process is then repeated on the opposite side. As will be appreciated the same result may be achieved by many variations of the described process and the entire bin module 50 need not be turned in a single session.

This method is faster, neater, works more with gravity and, consequently, requires less physical exertion than the alternative of turning the contents out onto the ground and then forking it all back into the bin which is the only viable methodology with conventional compost bins of the relevant size for aerobic composting.

Compost bin module 50 of this invention facilitates the highly efficient periodic turning of composting material; a fundamental requirement for commercially viable aerobic composting. Furthermore, the ability to easily move the compost bin to the source of the composting materials, or to the location where the compost will be used, or onto the site of an intended garden plot, or otherwise further improves the efficiency of the composting and gardening processes.

Further, the ability to create a compost bin assembly comprising a number of modules in series makes it versatile and highly efficient in producing compost not only in single batches but also, where greater volumes are required, in a production line.

It should be appreciated that although the invention has been described with reference to compost bins that are square or rectangular (i.e. have a square base of a rectangular base), the compost bin of the invention may have any other suitable geometric shape including, for example, triangular or hexagonal.

Structural members 2 extend from proximate to the bottom of posts 1 to below the horizontal mid-plane of posts 1. It is not necessary for the removable slats 5 to extend to the ground. The removable slats 5 have two functions; first, to provide optimal access to the contents of the bin and secondly to minimise the work that must be expended in turning the compost either in situ or by transferring the compost from one bin to an adjacent bin.

Compost bin module 50 of the present invention enables "unimpeded access". Provided removable slats 5 extend close enough to the ground such that the operator can easily step over structural members 2 located below removable slats 5, the presence of structural members 2 does not impede the efficiency of the turning process. Instead, there is an advantage to the configuration and position of structural members 2. By permanently enclosing the lower portion of bin module 50, structural members 2 contain any residue of compost that would otherwise, in the natural course of events, tend to migrate onto surrounding ground surfaces external to bin module 50 which looks untidy and is often difficult to clean up. Further, structural members 2 provide an effective stop plate which traps the compost, which is convenient if the last of the material in bin module 50 needs to be corralled and captured with fork or shovel.

The invention provides a freestanding compost bin with volume and shape suitable for efficient aerobic composting. It can be readily manufactured in high production volumes with consequent low cost, and can be easily shipped and warehoused at low cost, that can be readily exported without quarantine restrictions, that can be easily assembled off site, that is easily portable, that has zero site preparation costs, that has high durability without the requirement for periodic maintenance, that can be vermin proofed, that can be readily covered to exclude rain and consequent leachate problems and that can be easily combined to form multiple bins and that facilitates the highly efficient turning of the compost.

Although the invention has been described by way of example, it should be appreciated that variations and modifications may be made without departing from the scope of the invention as defined in the claims.

As used in this specification, the words "comprises", "comprising", and similar words, are not to be interpreted in an exclusive or exhaustive sense. In other words, they are intended to mean "including, but not limited to."

The invention claimed is:

1. A compost bin module for aerobic decomposition of organic matter, said module in the form of a container comprising a free-standing portable structural frame for placement on or above the ground, sidewalls all of which are removable, an open top and open bottom, each of said side walls insertable into said structural frame and laterally restrained thereby, wherein said structural frame comprises at least three spaced-apart posts, at least an equal number of structural members to said posts spanning between and interconnecting said posts, each of said structural members spanning between two adjacent posts at or near their base, and all of said structural members interconnect said posts at or near the base of said posts, said removable sidewalls are insertable into axially extending slots integral with said posts, said axially extending slots are located immediately above said structural members.

2. A compost bin module as claimed in claim 1, wherein at least one of said removable side walls is a plurality of slats.

3. A compost bin module as claimed in claim 1, wherein said compost bin module is removably connectable to a like compost bin module using connector means thereby forming a compost bin assembly.

4. A compost bin module as claimed in claim 3, wherein said connector means allow for said structural frame of said compost bin module to be connected to the structural frame of a like compost bin module in movable engagement, so that they slide relative to each other in a substantially vertical direction.

5. A compost bin module as claimed in claim 3, wherein when said compost bin module and like compost bin module are connected to each other they are vertically displaced to each other.

6. A compost bin module as claimed in claim 3, wherein at least two of said posts of said compost bin module have mating faces which are abutted and secured against the mating faces of at least two respective like posts of said like compost bin module to form at least two pairs of abutted posts.

7. A compost bin module as claimed in claim 6, wherein said mating faces of at least one of the pair of abutted posts each have axially extending re-entrant grooves.

8. A compost bin module as claimed in claim 7, wherein an axially extending joining strip spans between and engages with said axially extending re-entrant grooves.

9. A compost bin module as claimed in claim 1, wherein said at least three spaced apart posts are four posts, and said at least an equal number of structural members to said posts is four structural members.

10. A compost bin module as claimed in claim 1, wherein each said structural member has upper and lower faces and at least one axially extending boss adjacent each of said upper and lower faces and ends perpendicular to the longitudinal axis of said structural member, said axially extending boss being tapped at each end.

11. A compost bin module as claimed in claim 1, wherein in use with said sidewalls removed from said structural frame, a person can stand inside said structural frame and hold said structural members so as to be able to lift and transport said structural frame.

12. A compost bin assembly system for aerobic decomposition of organic matter, said system comprising:

a plurality of compost bin modules; each module in the form of a container comprising a free-standing portable structural frame, removable sidewalls, an open top and open bottom, each of said removable side walls made up of at least one component insertable into said structural frame and laterally restrained thereby; and a plurality of connector means for interconnecting said plurality compost bin modules when said modules are abutted against each other in side-by-side or end-to-end relationship, and said structural frame of each module comprises at least three spaced-apart posts, at least an equal number of structural members spanning between and interconnecting said posts, with each of said structural members at or near the base of said posts said removable sidewalls are insertable into axially extending slots integral with said posts, said axially extending slots are located immediately above said structural members.

13. A system as claimed in claim 12, wherein said connector means allow for said structural frames of at least two of respective said compost bin modules to be connected together in movable engagement, so that they slide relative to each other in a substantially vertical direction.

14. A system as claimed in claim 12, wherein when at least two said compost bin modules are abutted and connected to each other they are substantially vertically displaced to each other.

15. A system as claimed in claim 12, wherein said at least one component is a plurality of slats.

16. A system as claimed in claim 12, wherein in use with said sidewalls removed from said structural frame, a person can stand inside said structural frame and hold said structural members so as to be able to lift and transport said structural frame.

17. A compost bin module for aerobic decomposition of organic matter, said module in the form of a container comprising a free-standing portable structural frame for placement on or above the ground, sidewalls all of which are removable, each of said side walls insertable into said structural frame and laterally restrained thereby, wherein said structural frame comprises four spaced-apart posts, at least four structural members spanning between and interconnecting said posts, each of said structural members spanning between two adjacent posts at or near the base of said posts, and all of said structural members interconnect said posts at or near the base of said posts, said removable sidewalls are insertable into axially extending slots integral with said posts, said axially extending slots are located immediately above said structural members and said compost bin module removably connectable to a like compost bin module using connector means thereby forming a compost bin assembly.

18. A compost bin module as claimed in claim 17, wherein said connector means allow for said structural frame of said compost bin module to be connected to the structural frame of a like compost bin module in movable engagement, so they slide relative to one another in a substantially vertical direction.

19. A compost bin module as claimed in claim 17, wherein when said compost bin module and like compost bin module are connected to each other they are vertically displaced to each other.

* * * * *